Oct. 18, 1966  TOSHIO NOZAKI ET AL  3,279,524
OIL COMBUSTION APPARATUS
Filed Dec. 23, 1964  7 Sheets-Sheet 1

INVENTORS
Toshio Nozaki
Kunihito Mori
Tomohisa Maekawa
BY Stevens, Davis, Miller & Mosher
ATTORNEYS

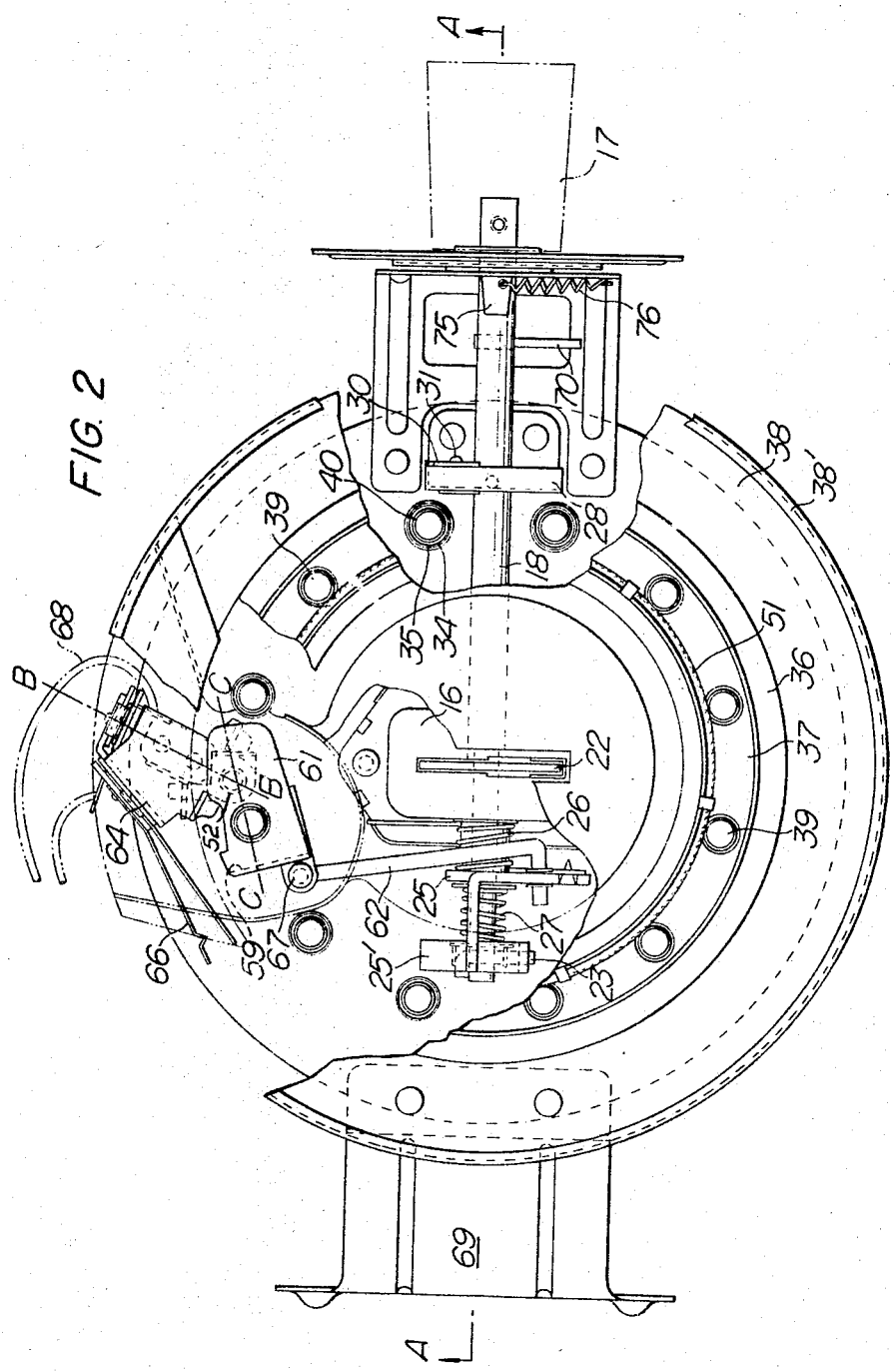

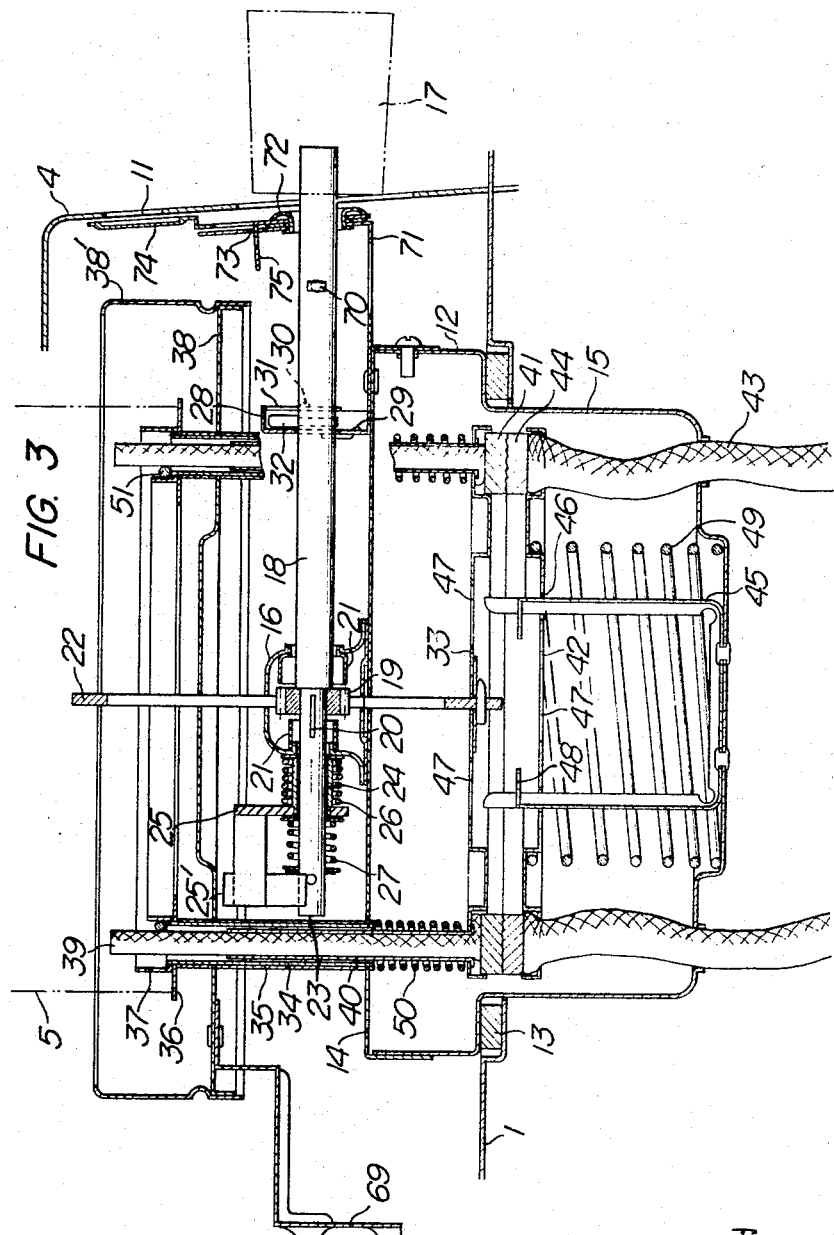

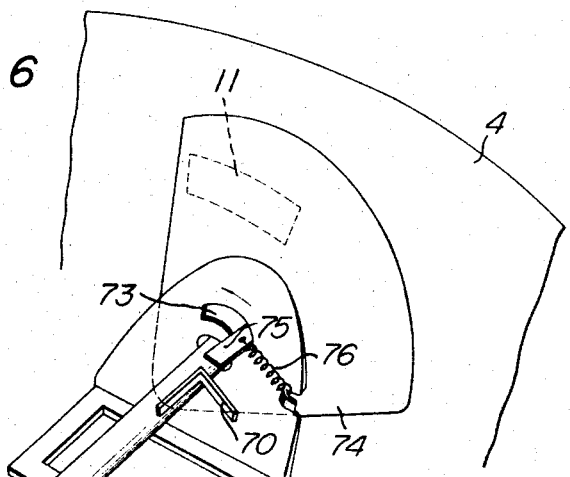
FIG. 6
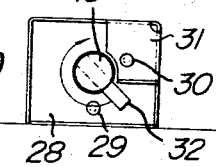 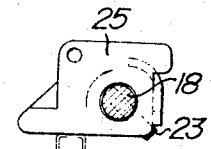
FIG. 5
(A)
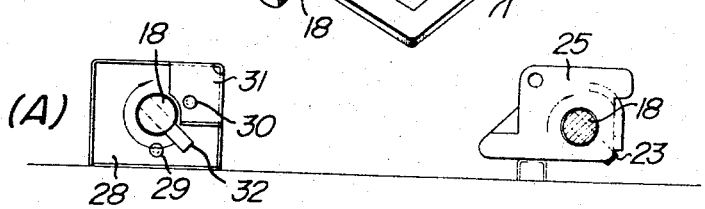
(B)
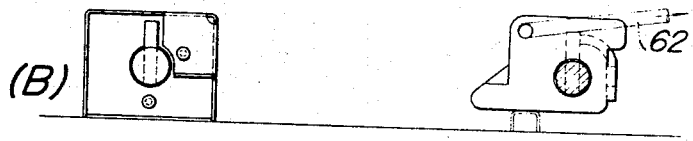
(C)
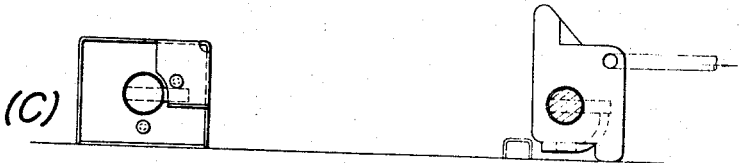
(D)
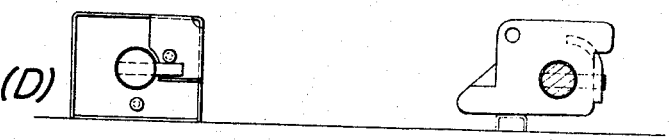

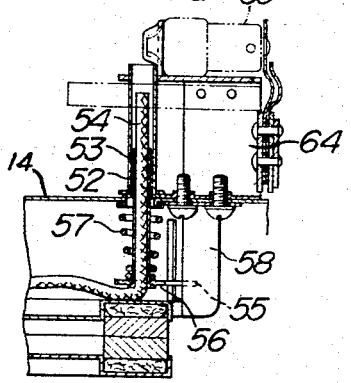
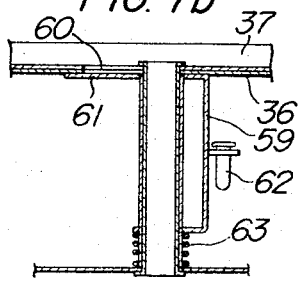
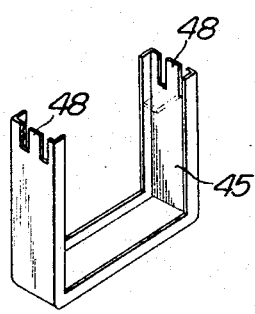
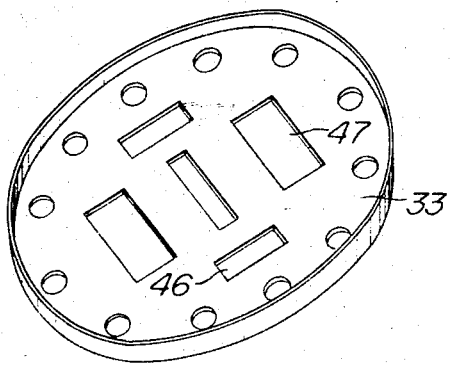
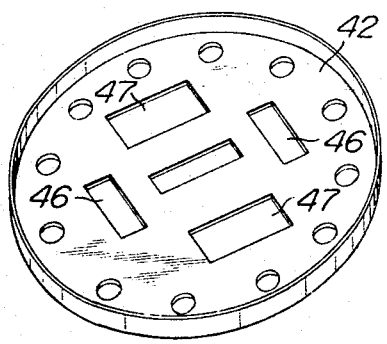

Oct. 18, 1966　　　TOSHIO NOZAKI ET AL　　　3,279,524
OIL COMBUSTION APPARATUS
Filed Dec. 23, 1964　　　　　　　　　　　　　　7 Sheets-Sheet 7
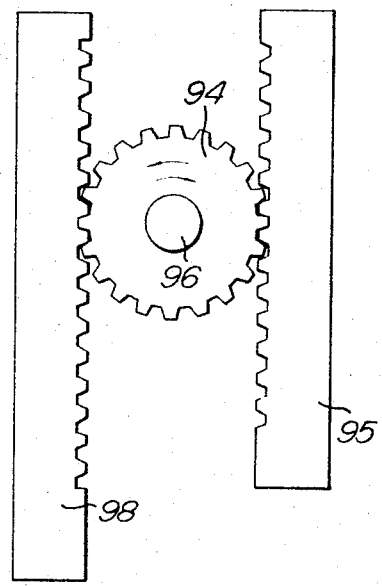
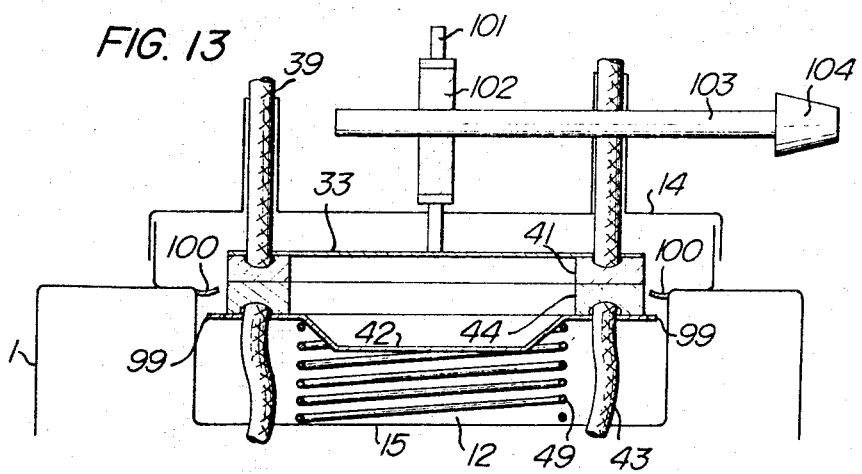
INVENTORS
Toshio Nozaki
Kunihito Mori
Tomohisa Maekawa
BY Stevens, Davis, Miller & Mosher
ATTORNEYS

United States Patent Office 3,279,524
Patented Oct. 18, 1966

3,279,524
OIL COMBUSTION APPARATUS
Toshio Nozaki, Toyonaka-shi, Kunihito Mori, Hirakata-shi, and Tomohisa Maekawa, Minoo-shi, Japan, assignors to Matsushita Electric Industrial Co. Ltd., Osaka, Japan, a corporation of Japan
Filed Dec. 23, 1964, Ser. No. 420,722
Claims priority, application Japan, Dec. 28, 1963, 39/34, 39/35, 39/36
9 Claims. (Cl. 158—94)

The present invention relates to oil combustion apparatus of the multi-wick type in which a multiplicity of wick guide tubes spaced apart a small distance therebetween are vertically annularly disposed between a fire tray in the combustion section and a reservoir containing fuel oil therein and wicks are arranged to be moved upwardly and downwardly in the wick guide tubes.

In oil combustion apparatus of multi-wick type, the wicks are disposed independently of one another and thus combustion air can freely be supplied to the periphery of each wick. By virtue of this structure, an increased amount of combustion can be obtained compared with a cylindrical wick and satisfactory combustion can thereby be effected. Cotton wicks occupying the most of wicks presently used in oil combustion apparatus are defective in that they are consumed relatively quickly and removal of deposits on the wicks requires considerable time and labor. A cutter is generally used to mechanically remove the deposits from the cotton wicks. Since however the deposits firmly adhere to the wick, a considerable force must be applied to tear off the deposits together with that portion of the wick or cut away the wick portion having the deposits thereon. Therefore, the wick was consumed extremely rapidly and had to be frequently replaced by new one. If the cotton wick should unintentionally be burnt without knowing that fuel oil has been exhausted, the wick will be consumed to an extent that it is no more unfit for use. Thus, it is difficult to mechanically remove the deposits from wicks, and this is especially so in the case of multi-wick type oil combustion apparatus because the wicks therein are independent of one another. Nature of the deposits is such that the deposits easily decompose and are burnt off when heated to a high temperature above 400° C. In oil combustion apparatus, however, temperature at the upper portion of a wick is generally slightly in excess of 100° C. under a normal combustion condition of the wick. In order therefore to bring the temperature at the upper portion of the wick to a high temperature of more than 400° C., the wick must be burnt in an abnormal state of combustion, for example, under a state of combustion without any fuel supply thereto. By thus causing the wick to burn in an abnormal state of combustion, it is possible to remove deposits accumulating on the wick but this manner of removal is hardly applicable to a cotton wick because of its ready consumption. This manner of deposit removal can easily be attained in case of a heat resisting wick such as of glass fibers, carbon fibers, sintered alloy or ceramics. But due to a continuous structure of the wick extending from a lower portion thereof immersed in the fuel reservoir to an upper portion thereof disposed near the fire tray, fuel oil in the fuel reservoir must be exhausted in each operation of deposit removal and then the wick is burnt under a condition of no fuel supply thereto, which operation of deposit removal is extremely troublesome. Further, this type of wick is defective in that it has a poor ability of fuel suction with attendant unsatisfactory combustion and it is quite expensive in itself. Moreover, a high material cost will be involved in the use of the heat resisting wick continuously extending from the lower part to upper part of oil combustion apparatus.

It is quite apparent that a marked advantage can be derived from the use of a wick for which removal of deposits accumulating on its burning portion can easily be effected by burning under no fuel supply thereto and which provides satisfactory combustion while it is economical in respect of cost. Suppose now a single wick is divided into two sections, that is, a wick section for combustion formed form such material as glass fibers, carbon fibers, sintered alloy or ceramics and a wick section for suction formed from cotton, asbestos or chemically synthesized fibers, and the two wick sections are normally made to abut with each other for combustion with the combustion wick section. This arrangement is quite economical because fuel can sufficiently be supplied to the combustion wick section through the suction wick section to effect satisfactory combustion and because an expensive material such as glass fibers need not be used to form the entire wick. Moreover, burning of the wick under no fuel supply thereto can easily be effected by merely causing the suction wick section to move away from the combustion wick section so that any deposits accumulating on the tip of the wick can be burnt off. Thus, the wick of this structure is quite satisfactory by virtue of its excellent effect.

It is therefore the primary object of the present invention to provide an oil combustion apparatus which has upper or combustion wicks of heat resisting material such as glass fibers and lower or suction wicks of high fuel suction ability such as cotton and in which arrangement is such that said upper and lower wicks are made to abut with each other under a normal combustion condition and are urged away from each other when it is required to remove carbonaceous deposits accumulating on the tips of the upper or combustion wicks whereby burning of the wicks for the purpose of deposit removal can easily be effected as desired regardless of presence or absence of fuel in the fuel reservoir.

Another object of the present invention is to provide an oil combustion apparatus in which an operating shaft for causing vertical movement of combustion wicks and suction wicks in a closely abutted relation with each other is merely pulled forwardly and rotated to cause movement of the combustion wicks away from the suction wicks so that removal of deposits accumulating on the tips of the combustion wicks can be effected with the suction wicks kept in the state separated from the combustion wicks, whereby the vertical movement of the wicks, igniting operation and burning of the wicks under no fuel supply can be attained by the manipulation of the single operating shaft.

A further object of the present invention is to provide an oil combustion apparatus having convenient means for displaying the state of deposit removal which means makes no coaction with the wick operating shaft during normal combustion but coacts with the wick operating shaft during burning of the wicks under no fuel supply to display that the apparatus is in the state of deposit removal operation.

Another object of the present invention is to provide an oil combustion apparatus which is provided with respective plate means for securely holding therein the lower ends of a plurality of upper or combustion wicks and the upper ends of a plurality of lower or suction wicks, said plate means being disposed in an auxiliary fuel reservoir so that the movement of the upper and lower wicks towards and away from each other is made in the auxiliary reservoir whereby the ends of the upper and lower wicks can firmly be held in the respective mounting plate means to insure uniform supply of fuel oil to the works to thereby effect satisfactory combustion and whereby handling, repairs, etc. of parts for causing the movement of the wicks towards and away from each other can easily be carried out in the auxiliary fuel reservoir.

Still another object of the present invention is to provide an oil combustion apparatus in which fuel absorptive contact cloth members are fitted to the respective ends of the combustion wicks and the suction wicks so that the combustion and suction wicks are made to abut with each other through the contact cloth members whereby fuel oil sucked up by the suction wicks can positively be supplied to the combustion wicks to effect satisfactory combustion.

A yet further object of the present invention is to provide an oil combustion apparatus provided with a control and guide member which is arranged to guide the vertical movement of the mounting plate means holding therein the upper ends of the suction wicks normally urged towards the combustion wicks and which is operative to limit the upward movement of the suction wick mounting plate means beyond a certain upward position, whereby the suction wicks can smoothly follow the vertical movement of the combustion wicks in a normal combustion condition and when the combustion wicks are moved upwardly above a definite position the suction wicks can easily be separated away from the combustion wicks to interrupt supply of oil to the latter so that burning of the latter under no fuel supply can be effected.

Various other objects and advantages of the present invention will become more apparent from the following description with reference to the accompanying drawings, in which:

FIG. 2 is an enlarged plan view of the oil combustion apparatus of FIG. 1 with parts of its combustion section cut away to show the internal structure;

FIG. 3 is a longitudinal sectional view taken substantially on the line A—A in FIG. 2;

FIGS. 5A, 5B, 5C and 5D are explanatory views showing the relation between the link plate and a pin at a bearing section in FIG. 4;

FIG. 6 is an enlarged perspective view of means for displaying the state of burning of wicks for deposit removal in the oil combustion apparatus of FIG. 1;

FIGS. 7a and 7b are fragmentary sectional views of the combustion section of the oil combustion apparatus, FIG. 7a showing the section taken on the line B—B in FIG. 2 and FIG. 7b showing the section taken on the line C—C in FIG. 2;

FIG. 8 is a perspective view of a wick mounting plate means for holding the lower ends of upper wicks, a wick mounting plate means for holding the upper ends of lower wicks, and a control and guide means for guiding both of the plate means; and FIGS. 9 to 13 are schematic explanatory views showing various other embodiments of the oil combustion apparatus according to the present invention.

Figure 1:
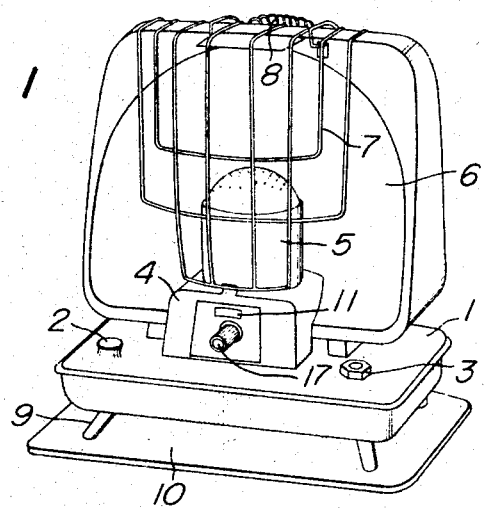
FIG. 1 is a perspective view of an embodiment of the oil combustion apparatus according to the present invention.
Figure 4:
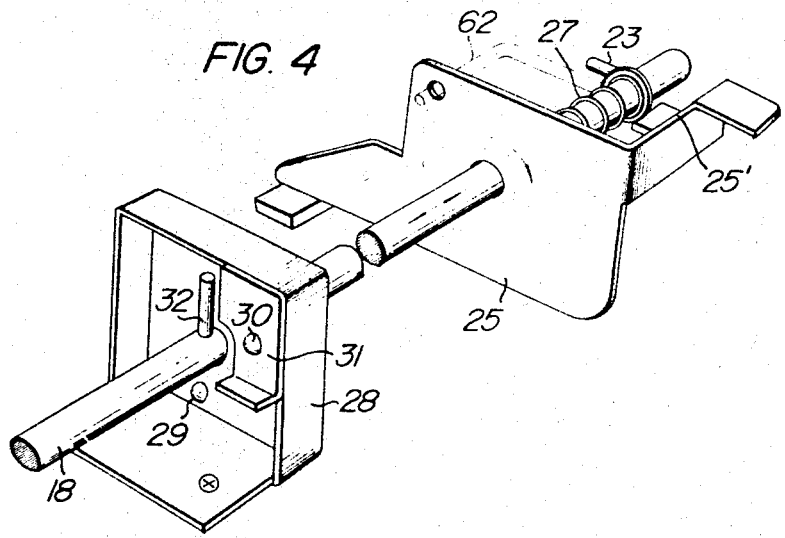
FIG. 4 is an enlarged perspective view of a link plate and parts associated therewith for causing vertical movement of wicks in the apparatus of FIG. 1.

The present invention will now be described with regard to an embodiment shown in FIGS. 1 through 8. Referring to FIG. 1 at first, there is shown a perspective external view of the oil combustion apparatus of the invention which comprises a main fuel reservoir 1 containing fuel such as kerosene therein and having an oil gauge 2 and an oil filling port 3 provided thereon. Centrally of the apparatus, there is provided an oil combustion section which is covered by a cover member 4, and a cylindrical chimney 5 is placed on the combustion section. On the rear side of the combustion section, there is provided a reflecting plate 6 for reflecting the heat of combustion in the forward direction. A guard member 7 is swingably hinged to an upper part of the reflecting plate 6 and depends downwardly in front of the combustion section to provide protection against possible injury to human bodies. Further, a handle 8 is fitted to the upper part of the reflecting plate 6 to provide means for carrying the combustion apparatus, and support legs 9 are fitted to the bottom of the fuel reservoir 1 to support the combustion apparatus on a base plate 10. A window 11 is formed in the cover member 4 covering the combustion section in order to display a state of operation of a wick operating knob 17 so that characters such as "under combustion" or "fire extinguished" can be seen from outside through the window 11.

Hereinunder, detailed description will be given with regard to the combustion section of the apparatus. An auxiliary reservoir 12 is detachably fitted in a central opening formed in the main fuel reservoir 1 and a packing 13 is inserted therebetween to provide oil-tight seal. The auxiliary reservoir 12 consists of a cover member 14 and a reservoir body 15. A plurality of perforations are annularly bored through both of the upper wall of the cover member 14 and the bottom wall of the reservoir body 15 in opposedly aligned relation to each other and the perforations in each annular row are spaced a small circumferential distance therebetween. An operating mechanism enclosure 16 is fixed on the central portion of the cover member 14 and an operating shaft 18 having thereon the above described knob 17 axially slidably is provided for the operating mechanism enclosure 16. A pinion 19 is mounted on the operating shaft 18 in the operating mechanism enclosure 16 in a manner to be axially slidable along a projection 20. Collars 21 in the operating mechanism enclosure 16 limit the axial movement of the pinion 19. A rack 22 vertically movably penetrates the operating mechanism enclosure 16 and the cover member 14 of the auxiliary reservoir 12 and is in meshing engagement with the pinion 19 for vertical movement. An engaging pin 23 is mounted on that end of the operating shaft 18 projecting rearwardly through the operating mechanism enclosure 16. A link collar 24 is loosely mounted on that portion of the operating shaft 18 projecting rearwardly through the operating mechanism enclosure 16. A link plate 25 is firmly secured to the link collar 24 and has its portion extended towards the pin 23 to form an abutment 25', a tip portion of which is arranged to be abutted by the pin 23. A helical spring 27 is coiled about the operating shaft 18 between the engaging pin 23 and the link plate 25 to normally urge the link plate 25 towards the operating mechanism enclosure 16. A helical spring 26 is coiled about the link collar 24 in a manner that one end thereof is fixed to the link plate 25 and the other end fixed to the operating mechanism enclosure 16. That portion of the operating shaft 18 carrying the knob 17 thereon is journalled in a bearing 28 provided on the cover member 14 of the auxiliary reservoir 12. The bearing 28 takes substantially the form of a box of shallow depth and is provided with a projection 29 on its bottom. A stop member 31 having a projection 30 is provided at one corner of the bearing 28 in a manner that it is spaced from the bottom on the side of the knob 17. A pin 32 is firmly secured to the operating shaft 18 at the position of the bearing 28 and is normally urged onto the bottom of the bearing 28 by the helical spring 27.

A wick mounting plate 33 of substantially flat shape is mounted on the lower end of the rack 22 in the auxiliary reservoir 12 and is provided with a plurality of perforations aligned with those of the cover member 14 and the body 15 of the auxiliary reservoir 12. A wick guide tube 34 of small diameter has its lower end inserted in each of the perforations formed in the reservoir cover member 14 and flared laterally outwardly for being firmly secured thereat. An outer sleeve 35 is coaxially fitted on each wick guide tube 34. The upper ends of the outer sleeves 35 are flared laterally outwardly so as to hold between their end edges a plate 36 of doughnut-like shape. A fire tray 37 of annular trough-like structure is supported on the plate 36 to surround between its upstanding walls the upper openings of the wick guide tubes 34.

A substantially disc-like heat shield 38 is suitably fitted to intermediate portions of the outer sleeves 35 to provide heat shielding means between the combustion section and the reservoir cover member 14 and has on its outer periphery detachably mounted a cylindrical wind shield 38'. The wind shield 38' effectively interrupts the wind blowing into the combustion section from outside so that combustion can be made without being affected by external wind. Combustion wicks 39 of heat resisting material such as glass fibers, carbon fibers, sintered alloy or ceramics are supported in a plurality of wick supporting tubes 40 which are fixed at lower ends in the perforations of the wick mounting plate 33. The upper end of each wick supporting tube 40 extends into the aligned wick guide tube 34 and thus the tips of the wicks 39 appear and disappear from the fire tray 37 as the wick supporting tubes 40 move upwardly and downwardly in the wick guide tubes 34. A contact cloth member 41 of highly fuel absorptive material such as felt is fixed to the wick mounting plate 33 and is brought into contact with the lower ends of the combustion wicks 39. There is also provided a wick mounting plate 42 of a shape similar to the wick mounting plate 33. The wick mounting plate 42 is also provided with a plurality of perforations in which are fixed the upper ends of suction wicks 43 of highly oil absorptive and oil resisting material such as cotton, staple fibers, asbestos or chemically synthesized fibers. The lower ends of the suction wicks 43 extend downwardly through the perforations formed in the bottom of the auxiliary reservoir body 15 into the main fuel reservoir 1 for being immersed in the fuel therein. A contact cloth member 44 of highly fuel absorptive material such as felt is fixed to the wick mounting plate 42 and is brought into contact with the upper ends of the suction wicks 43. The contact cloth member 44 is disposed opposite the contact cloth member 41 for relative movement towards and away from the latter. Therefore, the fuel in the main fuel reservoir 1 is sucked into the contact cloth member 44 through the suction wicks 43, thence through the contact cloth member 41 for supply to the combustion wicks 39.

The wick mounting plates 33 and 42 are formed with slots 46 guided by a control and guide member 45 and slots 47 through which top portion of the member 45 can pass. The slots 46 and 47 in the plate 33 are 90° displaced relative to those of the plate 42 as shown in FIG. 8. The control and guide member 45 is firmly fixed on the central inner bottom face of the auxiliary reservoir body 15 and is substantially U-shaped. The tip portions of opposed legs of the member 45 extend upwardly through the slots 46 of the wick mounting plate 42 and are bent at sufficiently high positions on the legs to form stops 48 so that the stops 48 may not abut the mounting plate 42 under the normal operating condition. A helical spring 49 is interposed between the bottom of the auxiliary reservoir body 15 and the wick mounting plate 42 to normally urge the wick mounting plate 42 hence the contact cloth member 44 towards the contact cloth member 41. A helical spring 50 is coiled about each of the wick supporting tubes 40 in the auxiliary reservoir 12 and is compressed between the wick mounting plate 33 and the cover member 14 when the associated combustion wick 39 is urged upwardly.

An ignition ring 51, which may be made of glass fibers or the like, is disposed in the fire tray 37 so as to contact the tips of the combustion wicks 39 for receiving the supply of fuel from the wicks 39. A fire extinguishing tube 52 extends upwardly from the reservoir cover member 14 at a position intermediate between two arbitrarily selected wick guide tubes 34 and terminates at a position approximately halfway of the vertical distance between the cover member 14 and the fire tray 37. An auxiliary wick 54 for ignition purpose is supported in a tube 53 which is accommodated in the fire extinguishing tube 52 for vertical movement therein. Therefore, the tip of the auxiliary wick 54 appears and disappears from the top opening of the fire extinguishing tube 52 by the vertical movement of the wick supporting tube 53. An abutment 56 having a tongue 55 is fixed to the lower end of the wick supporting tube 53 and is engaged by the wick mounting plate 33 in the upward movement of the plate 33 so as to cause the upward movement of the auxiliary wick 54. A helical spring 57 is coiled about the supporting tube 53 between the abutment 56 and the inner face of the reservoir cover member 14 in order to normally urge the supporting tube 53 downwardly so that the auxiliary wick 54 is always retracted into the fire extinguishing tube 52. An L-shaped guide plate 58 is fixed to the inner face of the reservoir cover member 14 in a manner that its depending portion is disposed in parallel with the supporting tube 53. The depending portion with a longitudinal guide slot through which the tongue 55 of the abutment 56 extends for guiding the vertical movement of the supporting tube 53. The lower portion of the auxiliary wick 54 supported in the supporting tube 53 is immersed in the fuel in the main fuel reservoir 1 like the wicks 43. A substantially U-shaped member 59 is directly mounted for free pivotal movement on one of the wick guide tubes 34 positioned adjacent the auxiliary wick 54 in a manner that the guide tube 34 penetrates parallel legs of the pivotal member 59. The upper leg of the pivotal member 59 makes sliding contact with the lower face of the plate 36 and act as a cover 61 to normally close an ignition aperture 60 formed in the fire tray 37 and the plate 36 at a position opposite the tip portion of the fire extinguishing tube 52 hence the tip portion of the auxiliary wick 54.

A connecting rod 62 is loosely mounted at one end in the pivotal member 59 to operatively connect the same with the link plate 25 so that the pivotal movement of the link plate 25 by the rotation of the operating shaft 18 can rotate the pivotal member 59 by way of the connecting rod 62 to thereby open the normally closed aperture 60. A helical spring 63 is provided at the lower portion of the wick guide tube 34 carrying thereon the pivotal member 59 so as to normally urge the cover 61 of the pivotal member 59 towards sliding contact with the lower face of the plate 36.

A heater supporting member 64 is suitably provided to support an ignition heater 65 for igniting the auxiliary wick 54 at a position above the fire extinguishing tube 52. Contact strips 66 for the ignition heater 65 are fitted to a portion of the heater supporting member 64 in electrically insulated relation thereto and are normally kept open. When, however, the connecting rod 62 is advanced by the rotation of the operating shaft 18, the pivotal end 67 of the connecting rod 62 at the pivotal member 59 urges one of the contact strips 66 towards the other to conduct current to the ignition heater 65. Thus, it will be understood that, by the mere rotation of the operating shaft 18, the conduction of current to the ignition heater 65, opening of the aperture 60 and upward movement of the auxiliary wick 54 can simultaneously be effected. Lead wires 68 and a battery mounting member 69 are provided for current supply to the heater 65.

It is so arranged that the operating shaft 18 can freely rotate until the engaging pin 23 is abutted by the abutment 25' of the link plate 25, and the combustion wicks 39 suitably protrude above the fire tray 37 for proper combustion at such position of the pin 23 at which it is abutted by the abutment 25'. Further rotation of the operating shaft 18 causes the pivotal movement of the link plate 25 against the force of the spring 26 since the pin 23 urges the abutment 25'. An abutment 70 is provided on the operating shaft 18 between the bearing 28 and the knob 17. An L-shaped supporting plate 71 is fixed at one panel thereof on the upper face of the reservoir cover member 14, and the operating shaft 18 extends through a bore in the other or upstanding panel of the plate 71. An eyelet 72 is fitted in this bore to permit free passage of the shaft 18 in the bore. An arcuate slot 73 is bored through the upstanding panel at a position above the eyelet 72. A display plate 74 is pivotally mounted on the eyelet 72 to display the operating condition such as burning of wicks for deposit removal and others. The indication of any particular operating condition can be seen from outside through the window 11 of the cover member 4 covering the combustion section. A portion of the display plate 74 is cut open to form a lug 75 and made to protrude towards the combustion section through the slot 73 of the supporting plate 71. A helical spring 76 is provided in tension between the lug 75 and the supporting plate 71 to normally urge the display plate 74 in one direction. It is so arranged that, when the operating shaft 18 is pulled forwardly against the force of the spring 27, the abutment 70 is moved to a point at which it abuts the lug 75. When the operating shaft 18 is rotated under the above condition, the abutment 70 urges the lug 75 so that the display plate 74 can pivot against the force of the spring 76. In this case, the position of the engaging pin 23 is displaced and there is no engagement between the pin 23 and the abutment 25' so that the combustion wicks 39 can solely be urged upwardly independently of the ignition unit.

In the oil combustion apparatus described above, the normal operative state of the apparatus is as shown in FIG. 3 and combustion is made under such state. Or more precisely, rotation of the operating shaft 18 causes engagement of the engaging pin 23 with the abutment 25' of the link plate 25 so that the tip portions of the combustion wicks 39 are exposed above the fire tray 37 by an amount suitable for proper combustion. By further rotation of the operating shaft 18, the pin 23 urges the link plate 25 to pivot it against the force of the spring 27 and the combustion wicks 39 are urged further upwardly by the action of the rack 22 and the pinion 19. The spring 49 causes the suction wicks 43 to follow the movement of the combustion wicks 39 so that the fuel can continuously be supplied to the combustion wicks 39 through the contact cloth members 41 and 44. The relation between the link plate 25 and the pin 32 at the bearing 28 is as shown in FIGS. 5A to 5D in which the relation successively changes from a state of FIG. 5A to a state of FIG. 5B, then to a state of FIG. 5C. Under this state, the wick mounting plate 33 is in its upward position and during the upward movement, it urges upwardly the lower end of the supporting tube 53 against the force of the spring 57 and thus the tip portion of the auxiliary wick 54 is exposed above the top opening of the fire extinguishing tube 52. The pivotal movement of the link plate 25 causes the pivotal movement of the pivotal member 59 through the connecting rod 62 connected therebetween and at the same time the pivotal end 67 urges the contact strips 66 towards each other to place the ignition heater 65 in operation, the heater 65 igniting the auxiliary wick 54 exposed above the top opening of the fire extinguishing tube 52. The pilot flame burning on the auxiliary wick 54 ignites the ignition ring 51 through the opened aperture 60 and subsequently spreads to the combustion wicks 39 for combustion of oil thereon. When under this combustion condition the grasping force on the operating knob 17 is released, the operating shaft 18 is rotated in the reverse direction through the link plate 25 by the action of the spring 27 to the normal operative position at which the combustion wicks 39 are exposed by a predetermined amount and combustion continues under this state. The relation between the link plate 25 and the pin 32 at the bearing 28 under normal combustion is as shown in FIG. 5B. Under the state of FIG. 5B, the pivotal member 59 and the auxiliary wick 54 have returned to their original positions and there is no combustion on the auxiliary wick 54. The latitude of the wick may be adjusted by means of the spring 26 which is provided to produce a force to pull the shaft 18 towards the left, as shown in FIG. 3. The frictional force between the bearing 28 and the pin 32 caused by the action of springs 49 and 50 prevents the shaft 18 from free rotation. Thus, the device of the present invention is adapted to make non-graduated adjustment of the latitude of the wick by the manipulation of the shaft 18.

In the above operation, the wick mounting plate 42 moves vertically in unitary relation with the combustion wicks 39 and the smooth movement thereof is guided by the control and guide member 45. The above manipulation can effect continuous combustion, but after a long time use tarry matters may accumulate on the combustion wicks 39 and unsatisfactory combustion may result. In such a case, it is necessary to remove the tarry matters, that is, fuel supply must be interrupted to burn the wicks 39 under no fuel supply thereto. When the operating shaft 18 is pulled forwardly against the force of the spring 27 from the combustion condition as shown in FIG. 5B, the engaging pin 23 is moved to a position at which it is displaced from the abutment 25' of the link plate 25 and at the same time the abutment 70 is moved to a position at which it engages the lug 75. When the operating shaft 18 is rotated under the above state, the combustion wicks 39 solely move upwardly independently of the igniting operation since now there is no engagement between the operating shaft 18 and the link plate 25. The suction wicks 43 are moved upwardly to a certain height by the action of the spring 49, but the mounting plate 42 therefor are engaged by the stops 48 and are held from further upward movement with the result that the combustion wicks 39 are separated from the suction wicks 43 at a position between the contact cloth members 41 and 44. Therefore, the combustion wicks 39 are now burning without any fuel supply thereto and tarry matters can be burnt off to obtain the wicks free from any deposits.

Meanwhile, the pin 32 provided on the operating shaft 18 rides onto the stop member 31 at the bearing 28 and is engaged by the projection 30 which prevents the shaft 18 from rotating in the backward direction. In the course of the burning operation of the wicks 39 under no fuel supply described above, the abutment 70 on the operating shaft 18 engages the lug 75 to pivot the display plate 74 against the force of the spring 76 for thereby indicating through the window 11 of the cover member 4 that the burning under no fuel supply is now proceeding. Therefore, it is known that deposits on the wicks 39 are now being removed by merely looking into the window 11 of the cover member 4. In order to bring back the above condition to the normal operative condition after the burning under no fuel supply has been completed, the pin 32 on the operating shaft 18 is disengaged from the projection 30 and the operating shaft 18 is rotated in the reverse direction. The spring 27 acts to restore the wicks and the operating shaft 18 to the original state. The display plate 74 is also urged by the spring 76 to retake the original position.

As described in detail in the above, the oil combustion apparatus of the present invention has the following advantages. Or more precisely, in the oil combustion apparatus, the wicks are divided into upper wicks and lower wicks, the upper or combustion wicks 39 being formed from heat resisting material such as glass fibers and the lower or suction wicks 43 being formed from material of high suction ability such as cotton, and these wicks 39 and 43 are arranged to be freely moved towards and away from each other. Therefore, in case unsatisfactory combustion results from accumulation of deposits on the combustion wicks after a long time use, the combustion wicks 39 may be urged away from the suction wicks 43 to interrupt the fuel supply to the combustion wicks 39 from the suction wicks 43. The combustion wicks 39 can thereby be burnt under no fuel supply thereto so that the deposits on the combustion wicks can easily be burnt off to obtain the wicks of satisfactorily operative state. The removal of the deposits can be effected at any desired time irrespective of presence or absence of fuel in the main fuel reservoir by the mere manipulation of interrupting the contact between the combustion wicks 39 and the suction wicks 43.

Further, in the inventive apparatus, pulling in the axial direction and subsequent rotation of the operating shaft 18 which is provided cause vertical movement of the wicks causes movement of the combustion wicks 39 away from the suction wicks 43 independently of the mechanism associated with the ignition unit, etc. to effect removal of deposits on the combustion wicks 39 as described above. Thus, in the inventive apparatus which has an external appearance quite similar to prior oil combustion apparatus, manipulation of the single operating shaft 18 can positively effect the vertical movement of the wicks as well as the deposit removing operation. The operating shaft 18 may merely be rotated for the normal combustion and may be pulled in the axial direction against the force of the spring and then rotated to effect burning of the combustion wicks 39 under no fuel supply thereto. The inventive apparatus of extremely simple structure can thus be operated in a remarkably simple manner and can quite conveniently be used by the users. Further, it is possible to extremely easily obtain the state in which the satisfactory combustion can continuously be effected, that is, the state in which the combustion wicks 39 are free from any deposits.

Further, in the burning of the combustion wicks 39 under no fuel supply thereto, the abutment 70 provided on the operating shaft 18 engages the lug 75 on the display plate 74 to cause the pivotal movement of the display plate 74 which thereby indicates that the combustion wicks 39 are now burning under no fuel supply thereto. This arrangement gives clear indication of the state of burning and provides easier handling of the apparatus.

Moreover, the vertical movement of the suction wicks 43 can extremely smoothly be effected since the vertical movement of the suction wicks 43 secured in the wick mounting plate 42 is guided by the control and guide member 45. The provision of the stops 48 on the control and guide means 45 limits the vertical movement of the suction wicks 43 beyond a definite position regardless of the fact that the suction wicks 43 are always urged upwardly by the spring. Therefore, vertical movement of the combustion wicks 39 beyond a predetermined position can easily cause separation of the combustion wicks 39 from the suction wicks 43 to place the combustion wicks 39 in the state of burning under no fuel supply thereto. Thus, the remarkably simple arrangement can break the contact between the wicks. The respective wick mounting plates 33 and 42 for the combustion wicks 39 and suction wicks 43 have the same shape which offers a remarkable advantage in the manufacture of these plates.

Flush mounting of the ends of the upper and lower wicks in the respective wick mounting plates 33 and 42 insures exact movement of the combustion wicks 39 towards and away from the suction wicks 43 and uniform supply of fuel to the combustion wicks 39, which can always be placed under a satisfactory combustion condition without any possibility of unusual combustion resulting from non-uniform supply of fuel. In oil combustion apparatus of multi-wick type, combustion air can freely be supplied to the periphery of each wick by virtue of disposition of the wicks independently of one another and thus an increased amount of combustion can be obtained compared with a wick of cylindrical shape. On the other hand, splitting of the wicks into upper and lower sections may result in a difficulty of uniform fuel supply to the independent wicks and fuel may only be supplied to several wicks, causing unusual combustion thereon. However, by virtue of the inventive structure as described above, fuel can uniformly be supplied from the suction wicks 43 to the combustion wicks 39 for complete combustion thereon. An extremely complicated structure may generally be required to insure positive and smooth movement of the combustion wicks 39 towards and away from the suction wicks 43 because the combustion wicks 39 are supported in respective tubes of small diameter. In the oil combustion apparatus of the present invention, however, the ends of the combustion wicks 39 and the suction wicks 43 are secured in the respective wick mounting plates 33 and 42 disposed in the auxiliary reservoir 12 and thus movement of the wicks towards and away from each other can positively be effected. This arrangement offers a marked advantage in respect of disassembling and repair in that, when there is no positive movement of the upper and lower wicks towards and away from each other, the auxiliary reservoir 12 may be disassembled into the cover member 14 and the reservoir body 15 for repair. Since, further, the combustion wicks 39 and the suction wicks 43 are moved towards and away from each other through the contact cloth members 41 and 44 of highly fuel absorptive material such as felt fixed to the respective wick mounting plates 33 and 42, there is utterly no fear of incomplete contact between the upper and lower wicks in the multi-wick type of apparatus. Fuel sucked into the suction wicks 43 can thus positively and uniformly be supplied to the combustion wicks 39 to provide complete combustion.

FIGS. 9 through 13 show various modifications effected on the oil combustion apparatus of FIGS. 1 through 8 in which the combustion wicks 39 of highly heat resisting material such as glass fibers are normally kept in close contact with the suction wicks 43 of material of high suction ability such as cotton under a normal operating condition and the former are urged away from the latter in case of, for example, unsatisfactory combustion resulting from accumulation of deposits on the former due to a long time use so that the combustion wicks 39 can be burnt with no fuel supply thereto. In FIGS. 9 through 13, like reference numerals appearing in FIGS. 1 through 8 are used to designate like parts, and differences from the structure shown in FIGS. 1 through 8 are solely described hereinunder.

Figure 9:
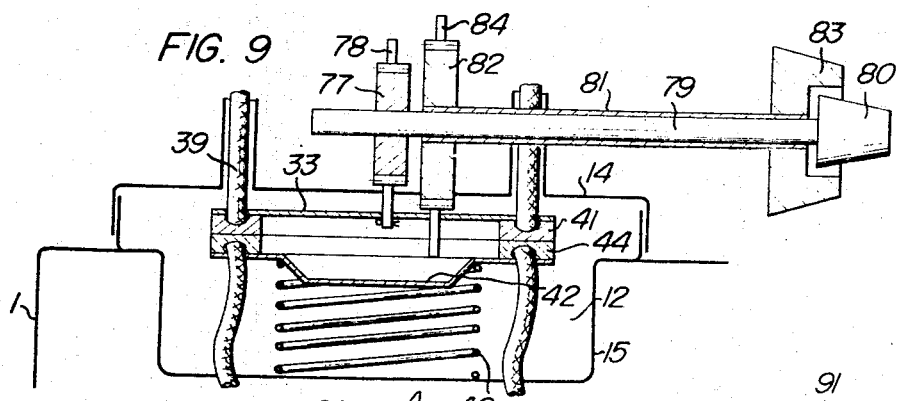

In a modification shown in FIG. 9, a pinion 77 is provided to drive a wick mounting plate 33 and is in meshing engagement with a rack 78 for causing vertical movement of the rack 78. The wick mounting plate 33 is secured to the lower end of the rack 78. The pinion 77 is mounted on an inner shaft 79 which is provided with an operating knob 80 at its front end. Manipulation of the operating knob 80 can drive the rack 78 through the pinion 77 to cause vertical movement of the wick mounting plate 33, hence vertical movement of combustion wicks 39. An outer or tubular shaft 81 coaxial with the inner shaft 79 is provided with a pinion 82 at its rear end and an operating knob 83 at its front end. The pinion 82 meshes with a rack 84 to cause vertical movement of the latter. The lower end of the rack 84 freely extends downwardly through a bore in the wick mounting plate 33 and is opposed by a wick mounting plate 42. It will be seen that the pinions 77 and 82 are coaxially mounted and the knobs 80 and 83 form a double knob.

The oil combustion apparatus with the structure of FIG. 9 operates in the following manner. In a normal operating condition, the operating knob 83 is set at a predetermined position at which the lower end of the rack 84 is spaced from the wick mounting plate 42, and the operating knob 80 is suitably rotated to cause vertical movement of the combustion wicks 39 through the pinion 77 and rack 78 to adjust the combustion condition and extinguish the fire as in the case of prior combustion apparatus. Under this state, contact cloth members 41 and 44 are kept in close contact with each other by the action of a spring 49 just as in the case of the previous embodiment of the combustion apparatus and fuel is continuously supplied to the combustion wicks 39. Then when it is desired to burn the wicks 39 under no fuel supply thereto, the operating knob 83 is manipulated to drive the rack 84 through the pinion 82, the rack 84 urging the wick mounting plate 42 downwardly against the force of the spring 49 to thus urge the contact cloth member 44 away from the contact cloth member 41. Therefore, fuel supply to the combustion wicks 39 is interrupted to burn the wicks 39 under no fuel supply thereto. When it is desired to supply fuel to the combustion wicks 39 again, the operating knob 83 is again manipulated to move the rack 84 upwardly away from the wick mounting plate 42, which is then urged upwardly by the action of the spring 49 so that the contact cloth members 41 and 44 are brought into close contact with each other to effect proper suction of fuel. It will be understood that, in this modification, burning of the wicks 39 for the purpose of deposit removal can easily be effected without the pulling operation of the wick operating shaft.

Figure 10:
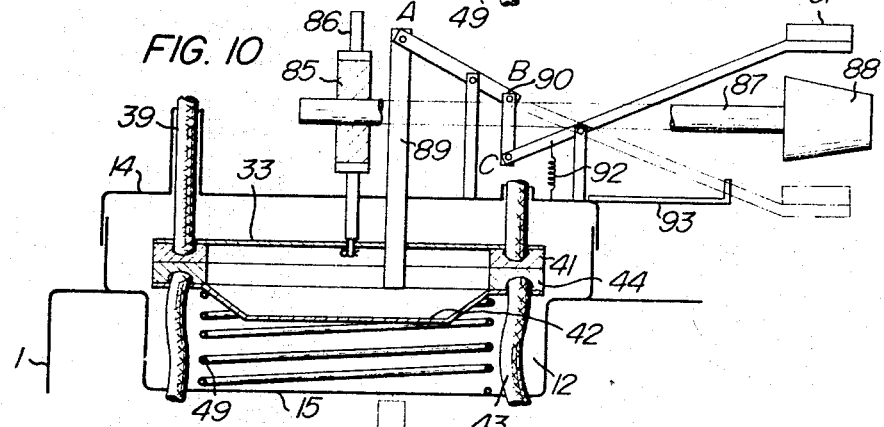

In a further modification of the oil combustion apparatus shown in FIG. 10, a pinion 85 for driving a wick mounting plate 33 is in meshing engagement with a rack 86 to cause vertical movement of the rack 86. The wick mounting plate 33 is secured to the lower end of the rack 86. The pinion 85 is mounted on an operating shaft 87, at the front end of which a driving knob 88 is mounted. Manipulation of the driving knob 88 drives the rack 86 through the pinion 85 to thereby cause vertical movement of the wick mounting plate 33, hence vertical movement of combustion wicks 39. A push rod 89 for urging a wick mounting plate 42 extends downwardly through a reservoir cover member 14 and through the wick mounting plate 33 to terminate at a position opposite the wick mounting plate 42. The push rod 89 is connected with an articulated lever system 90 for vertical movement. A manual push plate 91 is connected to the lever system 90. A helical spring 92 is provided to normally impart a downwardly directed force to a point C, hence a point B of the lever system 90. A stop 93 is fixed on the upper face of the reservoir cover member 14 so as to limit the pivotal movement of the push plate 91 when it is urged downwardly and at the same time to secure the push plate 91 at this downward position.

The oil combustion apparatus with the structure of FIG. 10 operates in the following manner. In a normal operating condition, the driving knob 88 is manipulated to rotate the operating shaft 87. Since contact cloth members 41 and 44 are kept in close contact with each other by the action of a helical spring 49 as in the case of the previous embodiment, fuel is continuously supplied to combustion wicks 39. Then when it is desired to effect burning of the combustion wicks 39 under no fuel supply thereto, the push plate 91 is manually urged downwardly to secure it at its downward position by the stop 93. This operation causes the points C and B to move upwardly and a point A to move downwardly. Therefore, the push rod 89 is urged downwardly to force the wick mounting plate 42 against the force of the spring 49 so that the contact cloth member 44 moves away from the contact cloth member 41. When it is desired to supply fuel to the combustion wicks 39 again, the push plate 91 is disengaged from the stop 93, the push plate 91 moving upwardly by the action of the spring 92 to provide close contact of the contact cloth members 41 and 44 with each other.

Figure 11:
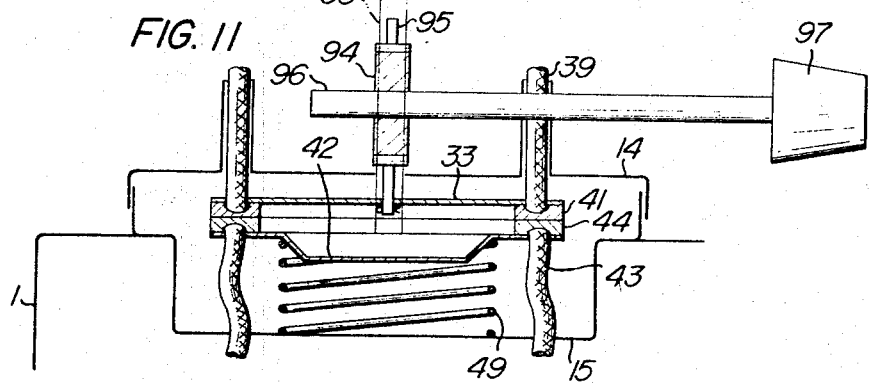

Another modification of the oil combustion apparatus is shown in FIGS. 11 and 12. A pinion 94 is provided to cause simultaneous movement of wick mounting plates 33 and 42 in directions opposite to each other. A rack 95 is fixed at its lower end to the wick mounting plate 33 and is in meshing engagement with the pinion 94. The pinion 94 is mounted on the rear end of an operating shaft 96, at the front end of which there is provided an operating knob 97. A rack 98 for forcing the wick mounting plate 42 meshes with the pinion 94 on the opposite side of the rack 95 and is longer than the rack 95. The lower end of the rack 98 extends downwardly through a reservoir cover member 14 and through the wick mounting plate 33 to terminate at a position opposite the wick mounting plate 42.

The oil combustion apparatus with the structure of FIGS. 11 and 12 operates in the following manner. In normal operation, the knob 97 is rotated within a predetermined range in which the lower end of the rack 98 is suitably spaced from the wick mounting plate 42 to drive the rack 95 for thereby causing vertical movement of the combustion wicks 39. Under this state, fuel is continuously supplied to the combustion wicks 39 as the wick mounting plate 42 is urged upwardly by the spring 49. When it is desired to break the close contact between the contact cloth members 41 and 44, the knob 97 may be rotated beyond the predetermined range. This operation causes further upward movement of the wick mounting plate 33 and further downward movement of the rack 98. The downwardly moving rack 98 forces the wick mounting plate 42 downwardly to cause movement of the contact cloth member 44 away from the contact cloth member 41 so that the combustion wicks 39 can be burnt under no fuel supply thereto. According to this embodiment, a marked advantage can be obtained because manipulation of the single operating shaft 96 can attain the vertical movement of the wicks as well as burning of the wicks under no fuel supply thereto for the purpose of deposit removal.

Still another modification of the oil combustion apparatus is shown in FIG. 13. Two projections 99 are formed at opposite positions on the outer peripheral edge of a wick mounting plate 42. Stops 100 are provided on an auxiliary reservoir body 15 at positions opposite the projections 99 in order to limit upward movement of the wick mounting plate 42 beyond the stops 100. As in the cases of the previous embodiments, means for causing vertical movement of the wicks include a rack 101, a pinion 102, an operating shaft 103 for driving the pinion 102 and a knob 104 on the operating shaft 103. In the oil combustion apparatus with the structure of FIG. 13, fuel is normally sucked up by suction wicks 43 for supply to combustion wicks 39 through contact cloth members 41 and 44 for combustion on the wicks 39. Vertical movement of the wicks 39 for normal combustion can be effected by rotating the operating knob 104 within a range in which the projections 99 may not be abutted by the stops 100. Under this state, the combustion wicks 39 and the suction wicks 43 are kept in close contact with each other by the action of a helical spring 49. Then when it is desired to effect burning of the combustion wicks 39 under no fuel supply thereto, the operating knob 104 may merely be rotated more than the predetermined range. By this rotation of the knob 104, the combustion wicks 39 are moved further upwardly but upward movement of the suction wicks 43 is limited by the abutment of the projections 99 with the stops 100. Thus, the contact between the combustion wicks 39 and the suction wicks 43 can positively be broken. This arrangement provides a marked advantage in respect of manufacture because the upper and lower wicks can be separated from each other by an extremely simple mechanism which can very easily be assembled.

Although the present invention has been described with regard to the specific embodiments, it will be understood that the present invention is in no way limited to such embodiments and various other changes and modifications may be made without departing from the spirit of the invention. Such modification may include, for example oil combustion apparatus having a cylindrical wick.

What is claimed is:

1. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a wick mounting plate for securely holding the lower ends of said combustion wicks, a wick mounting plate for securely holding the upper ends of said suction wicks, said wick mounting plates being operative in a manner that movement thereof relative to each other causes movement of said combustion and suction wicks towards and away from each other, a rack having its lower end terminated at a position opposite said wick mounting plate for said suction wicks to urge said suction wick mounting plate downwardly away from said combustion wick mounting plate, a pinion meshing with said rack, an operating shaft for causing vertical movement of said combustion wicks, a hollow operating shaft coaxially mounted on said operating shaft and having said pinion mounted thereon, and an operating knob on each of said operating shafts to provide a double knob structure.

2. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a wick mounting plate for securely holding the lower ends of said combustion wicks, a wick mounting plate for securely holding the upper ends of said suction wicks, said wick mounting plates being operative in a manner that movement thereof relative to each other causes movement of said combustion and suction wicks towards and away from each other, means for causing vertical movement of said combustion wick mounting plate, and a push rod actuated through a lever system for urging said suction wick mounting plate downwardly against the upwardly directed force normally applied to said suction wick mounting plate.

3. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a wick mounting plate for securely holding the lower ends of said combustion wicks, a wick mounting plate for securely holding the upper ends of said suction wicks, said wick mounting plates being operative in a manner that movement thereof relative to each other causes movement of said combustion and suction wicks towards and away from each other, a rack secured to said combustion wick mounting plate, a rack having its lower end terminated at a position opposite said suction wick mounting plate, and a pinion on an operating shaft meshing with both of said racks in a manner that its rotation in one direction causes vertical movement of said racks in directions opposite to each other, whereby the vertical movement of said combustion wicks and the movement of said combustion wicks and said suction wicks towards and away from each other can correlatively take place in a predetermined range by the manipulation of said single operating shaft.

4. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a wick mounting plate for securely holding the lower ends of said combustion wicks, a wick mounting plate for securely holding the upper ends of said suction wicks, said wick mounting plates being operative in a manner that movement thereof relative to each other causes movement of said combustion and suction wicks towards and away from each other, a rack for driving said combustion wicks, a pinion meshing with said rack, an operating shaft for driving said pinion, and a control and guide member for guiding vertical movement of said suction wick mounting plate following the vertical movement of said combustion wicks, said control and guide member being operative to limit the vertical movement of said suction wick mounting plate beyond a predetermined upward position.

5. An oil combustion apparatus comprising a main fuel reservoir for containing fuel therein, an auxiliary fuel reservoir disposed on said main fuel reservoir in fluid-tight relation thereto, a plurality of combustion wicks of heat resisting material such as glass fibers inserted for vertical movement in a plurality of wick guide tubes provided on said auxiliary reservoir in a manner to protrude upwardly therefrom, a plurality of suction wicks of material having a high fuel suction ability such as cotton, said suction wicks having their lower ends immersed in the fuel in said main fuel reservoir and having their upper ends normally urged towards said combustion wicks to make close contact with the same, a wick mounting plate disposed in said auxiliary fuel reservoir for securely holding the lower ends of said combustion wicks, a wick mounting plate also disposed in said auxiliary fuel reservoir for securely holding the upper ends of said suction wicks, said wick mounting plates being operative in a manner that movement thereof relative to each other causes movement of said combustion and suction wicks towards and away from each other, and means for causing vertical movement of said combustion wicks.

6. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a contact cloth member of highly absorptive material such as felt fixed to the lower ends of said combustion wicks and a contact cloth member of highly absorptive material such as felt fixed to the upper ends of said suction wicks so that the abutment of said combustion and suction wicks with each other is made through said contact cloth members, and means for causing vertical movement of said combustion wicks.

7. An oil combustion apparatus comprising a fuel reservoir for containing fuel therein, a plurality of combustion wicks of heat resisting material such as glass fibers inserted for vertical movement in a plurality of wick guide tubes provided on said fuel reservoir in a manner to protrude upwardly therefrom, a plurality of suction wicks of material having a high fuel suction ability such as cotton, said suction wicks having their lower ends immersed in the fuel in said fuel reservoir and having their upper ends normally urged towards said combustion wicks to make close contact with the same, a rack and a pinion for causing the vertical movement of said combustion wicks, a wick operating shaft carrying said pinion thereon and axially slidably supported with respect to said pinion, said wick operating shaft being normally coactively engaged by igniting means but disengaged therefrom when pulled forwardly, and display means coacting with said wick operating shaft when said wick operating shaft is pulled forwardly and subsequently rotated to move said combustion wicks away from said suction wicks so as to indicate the condition of separation of said combustion wicks from said suction wicks.

8. An oil combustion apparatus comprising a main fuel reservoir for containing fuel therein, an auxiliary fuel reservoir disposed on said main fuel reservoir in fluid-tight relation thereto, a plurality of wick guide tubes of small diameter annularly disposed on the cover member of said auxiliary fuel reservoir and extending upwardly therefrom, outer sleeves each concentrically surrounding one of said wick guide tubes, a fire tray provided in a manner that it is held between the upper edges of said wick guide tubes and said outer sleeves, a plurality of combustion wicks of heat resisting material such as glass fibers each supported in a wick supporting tube and inserted in said wick guide tube from the inside of said auxiliary fuel reservoir for vertical movement so as to be exposed above said fire tray and retracted downwardly from said fire tray, a wick mounting plate of substantially flat shape securely holding in said auxiliary fuel reservoir the lower ends of said wick supporting tubes supporting therein said combustion wicks, a contact cloth member of highly absorptive material such as felt fixed to said combustion wick mounting plate in closely abutted relation with the lower ends of said combustion wicks, a plurality of suction wicks of material having a high fuel suction ability such as cotton, said suction wicks having their lower ends immersed in the fuel in said main fuel reservoir and having their upper ends extended upwardly through the bottom of the body of said auxiliary fuel reservoir into said auxiliary fuel reservoir, a wick mounting plate of substantially flat shape for securely holding in said auxiliary fuel reservoir the upper ends of said suction wicks, a contact cloth member of highly absorptive material such as felt fixed to said suction wick mounting plate in closely abutted relation with the upper ends of said suction wicks, a control and guide member disposed on the bottom of the body of said auxiliary fuel reservoir for guiding upward movement of said suction wick mounting plate, said control and guide member being also operative to limit the upward movement of said suction wick mounting plate beyond a predetermined upward position, a spring means normally urging said suction wick mounting plate upwardly to bring said contact cloth members into close contact with each other, a rack extending downwardly through the central portion of the cover member of said auxiliary fuel reservoir and having its lower end secured to said combustion wick mounting plate, a pinion in meshing engagement with said rack for causing vertical movement of said rack hence vertical movement of said combustion wicks, an operating mechanism enclosure accommodating said rack and pinion therein and disposed on the cover member of said auxiliary fuel reservoir, an operating shaft slidably extending through said operating mechanism enclosure in a manner to be axially slidable with respect to said pinion, collars provided in said operating mechanism enclosure to limit the axial movement of said pinion within a definite range, an engaging pin mounted on one end of said operating shaft projecting rearwardly through said operating mechanism enclosure, a link collar freely mounted on said operating shaft between said engaging pin and said operating mechanism enclosure, a link plate firmly secured to said link collar, said link plate having its portion extended towards said engaging pin mounted on the end of said operating shaft, a portion of said extension being formed as an abutment for engagement with said engaging pin, a spring means coiled about said operating shaft between said engaging pin and said link plate for normally urging said link plate towards said operating mechanism enclosure, a spring means coiled about said link collar and having one end firmly secured to said link plate and the other end firmly secured to said operating mechanism enclosure, a bearing in the form of a box of shallow depth in which said operating shaft is journalled, said bearing having a stopper member with a projection provided at one corner thereof in a manner that said stopper member is spaced from the bottom of said bearing on the side of an operating knob on said operating shaft, a pin on said operating shaft, said pin being normally urged onto the bottom of said bearing by the action of said spring means disposed between said link plate and said engaging pin and being operative in response to the forward pull of said operating shaft to ride onto said stopper member on said bearing to stop the reverse rotation of said operating shaft, a supporting plate of substantially L-like shape having its one panel fixed on the cover member of said auxiliary fuel reservoir and having formed on the other panel thereof a slot of a shape forming an arc about said operating shaft, a display plate having a lug extending inwardly through the slot in said supporting plate, an abutment on said operating shaft, said abutment being engageable with said lug on said supporting plate when said operating shaft is pulled forwardly and then rotated to thereby rotate said display plate to give indication of the operating state such as burning of said combustion wicks under no fuel supply thereto, and igniting means actuated by the pivotal movement of said link plate caused by the engagement of said engaging pin with said link plate to ignite said combustion wicks.

9. An oil combustion apparatus comprising: a fuel tank for containing fuel therein, wick guide tubes provided on said fuel tank to protrude upwardly therefrom, combustion wicks made of heat-resistant material such as glass fibers for appearing from and disappearing into said wick guide tubes, suction wicks made of a material with good fuel suction ability such as cotton, the upper ends of said suction wicks facing the lower ends of said combustion wicks and the lower ends being immersed in the fuel contained in said fuel tank, a spring normally urging the upper ends of said suction wicks so as to be in close contact with the lower ends of said combustion wicks, a single operating shaft for effecting the upward and downward movements of said combustion wicks in close contact with said suction wicks, and means for separating the combustion wicks from the suction wicks by restricting the upward movement of said suction wicks to a predetermined position beyond the urging force of said spring when said combustion wicks have been moved by the manipulation of said operating shaft beyond the level in which said combustion wicks can effect normal combustion from balanced supply of air and fuel.

References Cited by the Examiner

UNITED STATES PATENTS

| 372,869 | 11/1887 | Seery | 67—70 X |
| 2,800,174 | 7/1957 | Konstandt | 158—88 |

FOREIGN PATENTS

| 6,855 | 5/1888 | Great Britain. |

FREDERICK KETTERER, *Primary Examiner.*